United States Patent
Holzschuh et al.

(10) Patent No.: US 8,181,754 B2
(45) Date of Patent: May 22, 2012

(54) BRAKE DISK

(75) Inventors: Ralph Holzschuh, Neuhausen (DE); Matthias Leonhardt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/684,647

(22) Filed: Jan. 8, 2010

(65) Prior Publication Data
US 2010/0175955 A1    Jul. 15, 2010

(30) Foreign Application Priority Data

Jan. 14, 2009  (DE) .......... 10 2009 000 196

(51) Int. Cl.
*B60T 13/74* (2006.01)
*F16D 65/12* (2006.01)
(52) U.S. Cl. ............... 188/218 XL; 188/264 A
(58) Field of Classification Search ............ 188/218 XL, 188/264 A, 264 AA
See application file for complete search history.

(56) References Cited

U.S. PATENT DOCUMENTS

| 6,260,669 | B1 | 7/2001 | Daudi | |
|---|---|---|---|---|
| 6,880,683 | B1 | 4/2005 | Miles | |
| 2003/0173166 | A1* | 9/2003 | Garfinkel et al. | 188/264 A |
| 2006/0086579 | A1* | 4/2006 | Gerber | 188/218 XL |
| 2007/0119667 | A1* | 5/2007 | Hanna et al. | 188/218 XL |
| 2007/0199778 | A1* | 8/2007 | Lee | 188/218 XL |
| 2009/0314591 | A1* | 12/2009 | Suppiah | 188/218 XL |

FOREIGN PATENT DOCUMENTS

| DE | 24 59 859 | 6/1976 |
|---|---|---|
| DE | 195 06 014 | 8/1996 |
| DE | 103 34 555 | 2/2005 |
| DE | 10 2007 013 512 | 9/2008 |
| EP | 0 680571 | 8/1994 |

* cited by examiner

*Primary Examiner* — Christopher Schwartz
(74) *Attorney, Agent, or Firm* — Kenyon & Kenyon LLP

(57) ABSTRACT

A brake disk is made up essentially of a brake cup and a friction ring. The friction ring includes two friction ring halves, between which cooling channels are situated. Additional air routing elements are situated at the level between the friction ring halves. The brake disk has especially satisfactory cooling characteristics.

18 Claims, 3 Drawing Sheets

BRAKE DISK

BACKGROUND INFORMATION

A brake disk is described in German Patent No. 195 05 014. The brake disk is designed as an internally ventilated brake disk having cooling channels disposed between two friction rings. In order to improve the heat dissipation, the brake disk is provided with additional air routing elements. The air routing elements are situated on the side of the friction rings lying radially on the inside, in a plane outside the two friction rings on a support section. The support section and one of the two friction rings are designed as a single piece or as a common component. The brake disk has a relatively large design volume, especially a relatively large height or thickness. Furthermore, because the support section and one of the two friction rings are designed as one piece or as a common component, in particular from casting material, the weight of the brake disk is relatively high.

In addition, it is described in European Patent No. EP 0 680 571, for example, to design the brake cup and friction ring as separate components which are interconnected via connecting elements.

In U.S. Pat. No. 6,880,683 and German Patent No. DE 103 34 555, air routing elements for improving the cooling capacity at brake disks of two-wheelers are described, the brake disks including only a single friction ring in each case.

SUMMARY OF THE INVENTION

The present invention is based on an objective of providing a brake disk which has especially satisfactory cooling characteristics while having a compact size.

The present invention is based on the idea of placing the air routing elements at the level of the cooling channels between the planes of the friction ring halves.

In this way the air routing elements do not project beyond the friction ring halves, so that the thickness or height of the brake disk is reduced in comparison with the related art according to German Patent No. DE 195 05 014. In addition, the efficiency of the air routing elements is increased since they now convey the cooling air into the cooling channels or evacuate it therefrom in a selective manner.

For a compact design of the brake disk, it is provided to situate the air routing elements in an annular receiving region between the brake cup and friction ring.

If this receiving region is designed as a virtually closed region on the side pointing in the direction of the wheel hub, then this offers the advantage that the entire cooling air reaches the cooling channels, without any transverse flow losses.

Moreover, it is especially advantageous to develop the brake cup and friction ring as separate components which are connected to one another. This makes it possible to reduce the weight of the brake disk, or else to optimize the mechanical or thermal characteristics.

By forming the air routing elements as one piece on the brake cup or the friction ring, the air routing elements may be realized in a cost-effective manner if, for example, they are formed during the casting the components as well.

As an alternative, the air routing elements may be situated on a separate support element. This permits a great variety of variants of brake disks to be produced in a simple manner, for instance through different types of air routing elements, without requiring changes in the brake cup or the friction ring.

The flow direction of the cooling air is able to be influenced quite easily by an inclination of the air routing elements in the direction of rotation of the brake disk or counter thereto, so that an adaptation of the particular conditions is possible.

Moreover, the efficiency or the cooling capacity is able to be increased by twisting the air routing elements in the manner of turbine blades.

DETAILED DESCRIPTION

Figure 1:
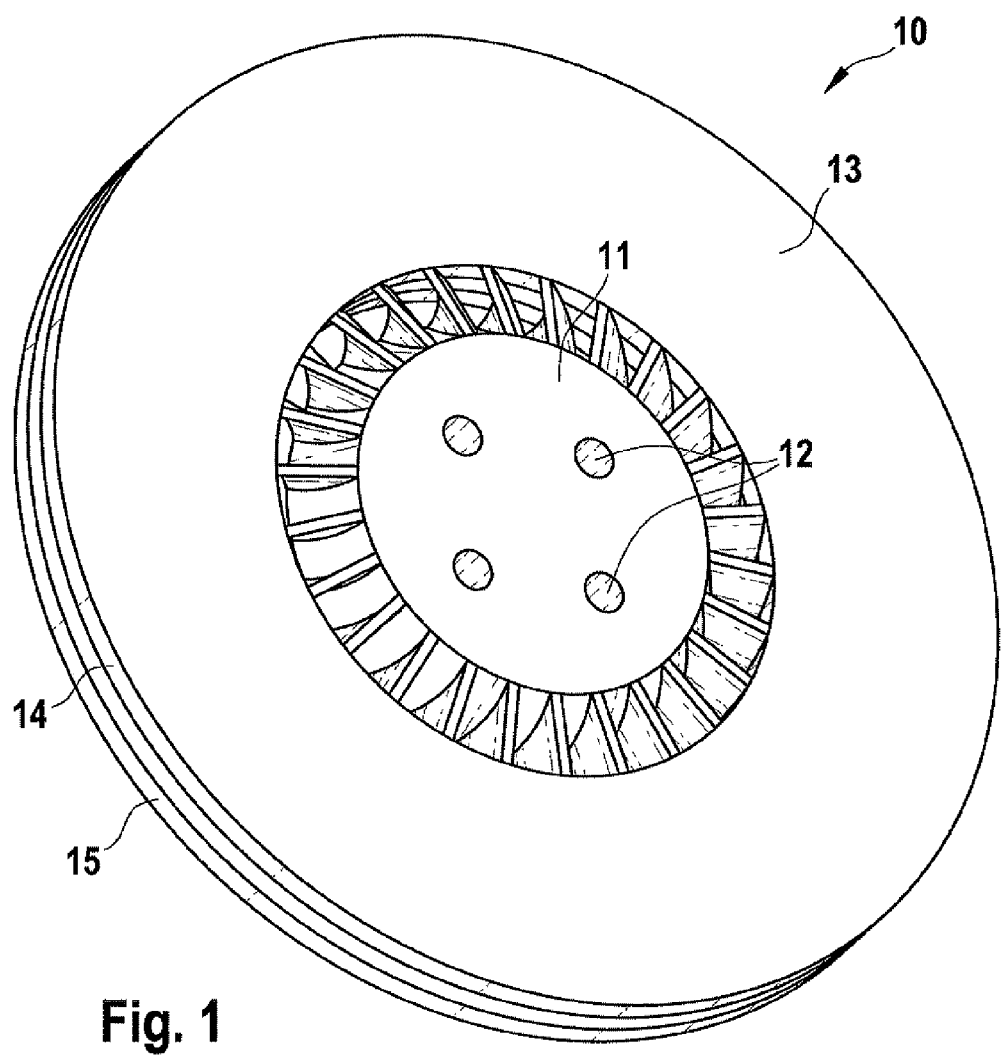
FIG. 1 shows a perspective view of a brake disk according to the present invention.
Figure 2:
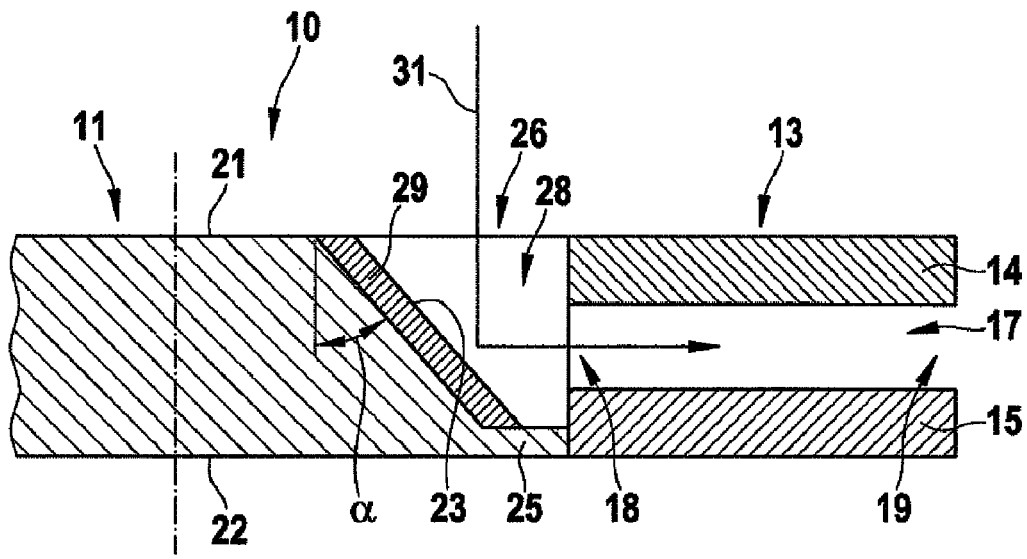
FIGS. 2 and 3 show simplified partial sections through brake disks according to the present invention.
Figure 3:
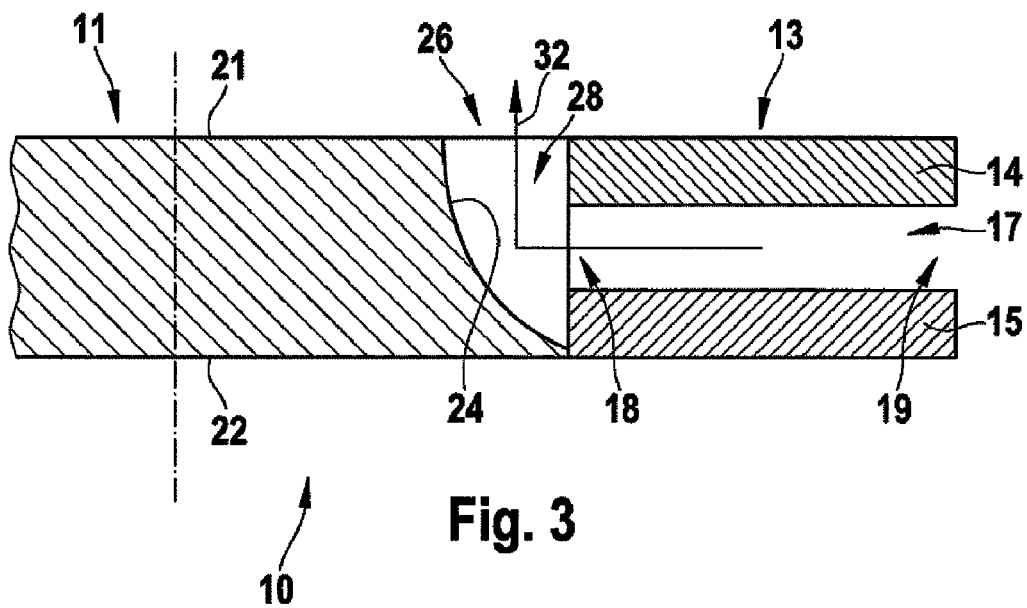

FIG. 1 shows an internally ventilated brake disk 10 for a motor vehicle. Brake disk 10 has a centrally situated brake cup 11, in which four holes 12, for example, are formed to fix brake disk 10 in place on a hub (not shown) of the motor vehicle. Brake cup 11 is surrounded by a friction ring 13, which is made up of two friction ring halves 14, 15. The two friction ring halves 14, 15, situated parallel to one another, are interconnected in the known manner with the aid of connecting webs (not shown), cooling channels 17 being formed between the two friction ring halves 14, 15 (FIGS. 2 and 3). Cooling channels 17 extend in the form of a star between region 18 lying radially inside, and region 19 of friction ring 13 lying radially outside. Friction ring halves 14, 15 cooperate with brake pads of the motor vehicle in the known manner, the heat generated in friction ring 13 due to friction heat being routed partially out of friction ring 13 via cooling channels 17.

As can be gathered from FIGS. 2 and 3, in particular, brake cup 11 has a smaller diameter on front side 21 facing away from the wheel hub than on rear side 22 facing the wheel hub. This results in a frustoconical shape of brake cup 11 having a sidewall 23, 24. According to FIG. 2, side wall 23 is planar and has an angle α of between 10 and 50 degrees relative to the perpendicular line. In contrast, in the case of a side wall 24 according to FIG. 3, side wall 23 has a concave design. In addition, it can be gathered from FIGS. 2 and 3 that rear side 22 of brake cup 11 extends up to the one friction ring half 15 or is connected thereto. In FIG. 2, this is accomplished with the aid of an annular intermediate region 25 of brake cup 11. This results in a rear side of brake disk 10 which preferably has a closed design.

While friction ring 13 is preferably produced from gray cast iron, brake cup 11 is either likewise produced from gray cast iron or alternatively from some other material such as an aluminum alloy. If brake cup 11 and friction ring 13 are made from the same material, then brake disk 10 described up to this point may be produced by a single manufacturing step, especially by casting. If brake cup 11 and friction ring 13 are produced as separate components, then they are connected to one another in the known manner, either directly or with the aid of additional connection elements, as described in European Patent No. 0 680 571, for instance.

Because of the frustoconical form of brake cup 11 and the closed rear side of brake disk 10, an annular opening 26 or an annular receiving region is formed on the side of brake disk 10 facing away from the wheel hub. As can be seen in FIG. 1, in particular, turbine- or blade-shaped air routing elements 28 are situated inside opening 26. Air routing elements 28 cooperate with cooling channels 17 in friction ring 13 in such a way that air routing elements 28 selectively supply air flows into cooling channels 17 while the motor vehicle is in motion, in order to more rapidly supply and dissipate the external air that is cooling brake disk 10.

Air routing elements 28 may either be twisted in the form of a blade or turbine, or else they may have a straight design. Furthermore, they may be placed at an incline either in the direction of rotation of brake disk 10 or counter thereto.

In the case of a brake cup 11 produced by a casting process, air routing elements 28 preferably situated at equal angular intervals with respect to one another may preferably be integrally formed on its side wall 24 (FIG. 3). However, it is also conceivable to connect the individual air routing elements 28 to side wall 23 or to friction ring 13 with the aid of separate affixation elements or else with the aid of a shared support ring 29 (FIG. 2) on which air routing elements 28 are affixed or integrally formed.

Figure 4:
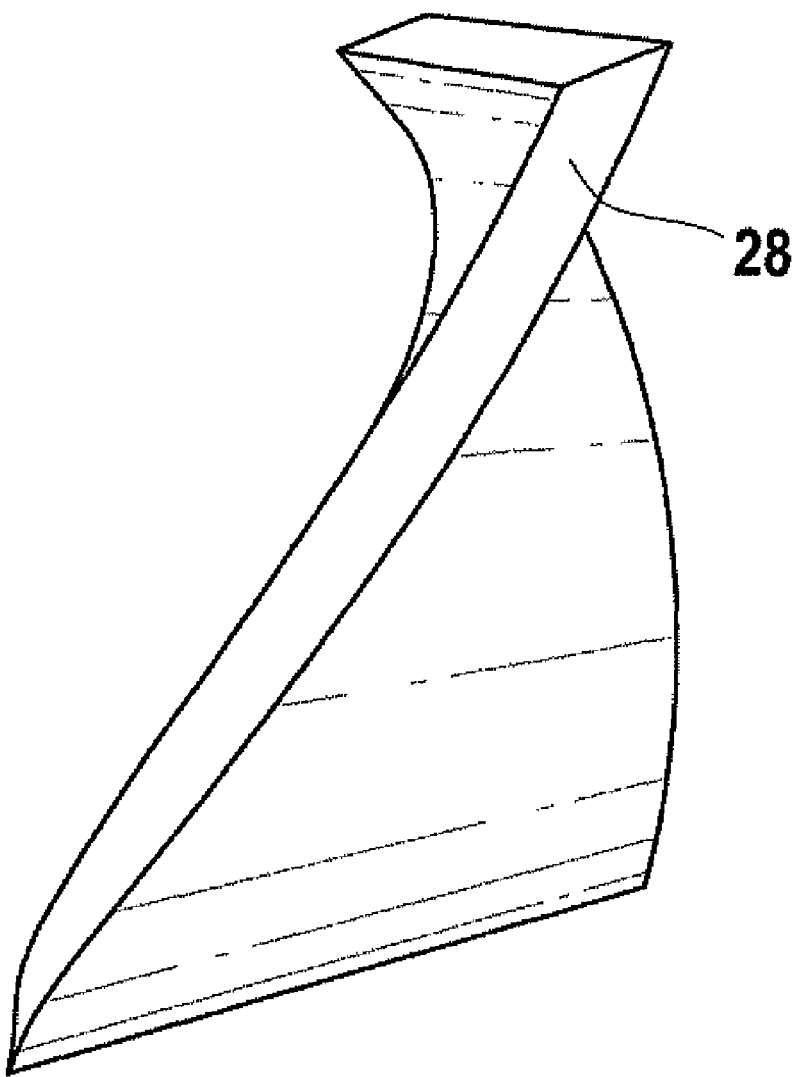
FIG. 4 shows a perspective view of an air routing element, which is used in a brake disk according to the present invention.

FIG. 4 shows an individual air routing element 28, which is twisted in the form of a spiral and produced by an extrusion process. The ratio between extrusion clearance (this is the length at which a 360-degree twisting of air routing element 28 is implemented) and the extrusion depth amounts to between 1:4 and 1:8. This makes it possible to achieve appropriate cooling of brake disk 10. The extrusion clearance is the extrusion depth required in order to realize a screwing/twisting of 360°. The extrusion depth is the length of air routing element 28.

Air routing elements 28 have a height such that they preferably extend into the plane of front side 21 of brake disk 10, or such that they end flush with front side 21 and therefore fully utilize the height of opening 26. Furthermore, air routing elements 28 are placed in such a way that cooling channels 17 are at least partially situated in the free spaces between air routing elements 28 in order to enable an optimal passage of the air through cooling channels 17.

Because of the form and placement of individual air routing elements 28, in particular the direction of flow and the flow rate of the air through cooling channels 17 of brake disk 10 are able to be influenced. FIG. 2, for example, shows the case in which the air passes through cooling channels 17 according to arrow 31, from the inside to the outside from a radial point of view. In contrast, in FIG. 3, cooling channels 17 are traversed according to arrow 32, from the outside to the inside from a radial point of view.

What is claimed is:

1. A brake disk comprising:
   a central element connectable to a wheel hub;
   a friction ring surrounding the central element, the friction ring having two disk-shaped friction ring halves, between which cooling channels are situated to cool the friction ring; and
   air routing elements for the cooling channels, the air routing elements being situated on a side of the friction ring halves lying on a radially inner side, the air routing elements being at least partially situated at a level of the cooling channels between planes of the friction ring halves,
   wherein a thickness of the central element is substantially same as a thickness of the friction ring having the two disk-shaped friction ring halves, and at least one of the air routing elements extends from a first side surface of the central element to a second side surface of the friction ring, the second side surface being opposite to the first side surface.

2. The brake disk according to claim 1, wherein an annular receiving region to accommodate the air routing elements is formed between the central element and the friction ring.

3. The brake disk according to claim 2, wherein the central element and the friction ring form an at least virtually closed area on a plane facing the wheel hub.

4. The brake disk according to claim 1, wherein the central element has a frustoconical form having a lateral area the lateral area has an angle of 10 degrees to 50 degrees relative to a perpendicular line, and the air routing elements are situated between the lateral area and the friction ring.

5. The brake disk according to claim 1, wherein the central element and the friction ring are separate components connected to one another.

6. The brake disk according to claim 5, wherein the central element and the friction ring are made from different materials.

7. The brake disk according to claim 1, wherein the air routing elements are integrally formed on the central element or on the friction ring.

8. The brake disk according to claim 1, wherein the air routing elements are situated on a support element, and the support element is connected to the central element or to the friction ring.

9. The brake disk according to claim 1, wherein the air routing elements are situated at an incline in a direction of one of rotation of the brake disk and counter-rotation of the brake disk.

10. The brake disk according to claim 1, wherein the air routing elements have a twisted design.

11. The brake disk according to claim 1, wherein the brake disk is in a motor vehicle.

12. The brake disk according to claim 1, wherein the central element has a frustoconical form having a lateral area the lateral area has a concave design, and the air routing elements are situated between the lateral area and the friction ring.

13. The brake disk according to claim 1, wherein a trench is formed between the side surface of the central element and the side surface of the friction ring, and the at least one of the air routing elements extends across the trench from the side surface of the central element to the side surface of the friction ring.

14. The brake disk according to claim 1, wherein each of the air routing elements extends from the central element to the friction ring.

15. The brake disk according to claim 1, wherein the air routing elements are located in the radial direction of the brake disk between the friction rings and the central element and in the axial direction of the brake disk, together with the central element, between the outer plane faces of the friction ring halves.

16. The brake disk according to claim 15, wherein the central element has a frustoconical form having a lateral area the lateral area has a concave design, and the air routing elements are situated between the lateral area and the friction ring.

17. The brake disk according to claim 15, wherein a trench is formed between the side surface of the central element and the side surface of the friction ring, and the at least one of the air routing elements extends across the trench from the side surface of the central element to the side surface of the friction ring.

18. The brake disk according to claim 15, wherein each of the air routing elements extends from the central element to the friction ring.

* * * * *